(12) United States Patent
Ghica et al.

(10) Patent No.: US 12,613,682 B2
(45) Date of Patent: Apr. 28, 2026

(54) PROGRAM COMPILATION METHOD AND APPARATUS

(71) Applicant: HUAWEI TECHNOLOGIES CO., LTD., Guangdong (CN)

(72) Inventors: Dan Ghica, Edinburgh (GB); Le Tu, Hangzhou (CN); Mario Alvarez-Picallo, Edinburgh (GB); Lijuan Hai, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 263 days.

(21) Appl. No.: 18/400,286

(22) Filed: Dec. 29, 2023

(65) Prior Publication Data

US 2024/0134618 A1 Apr. 25, 2024
US 2024/0231775 A9 Jul. 11, 2024

Related U.S. Application Data

(63) Continuation of application No. PCT/CN2022/101345, filed on Jun. 25, 2022.

(30) Foreign Application Priority Data

Jun. 30, 2021 (CN) ......................... 202110742873.X

(51) Int. Cl.
*G06F 8/41* (2018.01)
*G06F 17/11* (2006.01)
(52) U.S. Cl.
CPC ................ *G06F 8/41* (2013.01); *G06F 17/11* (2013.01)
(58) Field of Classification Search
CPC ........................................................ G06F 8/41
See application file for complete search history.

(56) References Cited

U.S. PATENT DOCUMENTS 6,728,953 B1 * 4/2004 Walster .................. G06F 8/443
717/151
6,895,574 B2 5/2005 Walster
(Continued)

FOREIGN PATENT DOCUMENTS

AU 2021263793 A1 * 7/2022 ................ G06F 8/41
CN 113327307 A * 8/2021 ............. G06F 18/22
CN 114327469 A * 4/2022

OTHER PUBLICATIONS

NPL_LI, QING_CN 113327307 A (Year: 2021).*
(Continued)

*Primary Examiner* — Ziaul A Chowdhury

(57) ABSTRACT

A program compilation method and apparatus operate by: obtaining a first expression and a second expression of a program, where the first expression and the second expression generate a dependency relationship based on a first variable, and operation types of the first variable in the first expression and the second expression are different, and updating an operation type of the first variable; so that the first variable has no differential result or a result is zero after encountering a differential operation; separately processing the first expression and the second expression according to the updated operation type of the first variable, to obtain a corresponding derivative function expression; and; combining, based on a chain rule, derivative function expressions respectively corresponding to the first expression and the second expression, to obtain a compilation result of the program.

20 Claims, 6 Drawing Sheets

(56)                    References Cited

U.S. PATENT DOCUMENTS

| | | |
|---|---|---|
| 8,739,137 B2 | 5/2014 | Siskind et al. |
| 2009/0265685 A1 | 10/2009 | Guenter |
| 2010/0241827 A1* | 9/2010 | Yu .......................... G06F 8/314 |
| | | 712/30 |

OTHER PUBLICATIONS

NPL_GAMBETTA JAY_AU 2021263793 A1 (Year: 2022).*
NPL_XU, Shan-shan_CN 114327469 A (Year: 2022).*
Extended European Search Report issued in EP Application No. 22831906.7 dated Aug. 26, 2024.

* cited by examiner

Mathematical expression 1:

$$f_0 = x$$
$$f_n = f_{n-1} \cdot x$$

Program expression 1:

```
func f(x, n):
    res = x
    for (i in 0 to n-1):
        res = res * x
    return res
```

Derivation result of the mathematical expression 1:

$$f_0' = 1$$
$$f_n' = f_{n-1}' \cdot x + f_{n-1}$$

Derivative function expression of the program expression 1:

```
func f_grad(x, n):
    res = x
    res_grad = 1
    for (i in 0 to n-1):
        res_grad = res_grad * x + res
        res = res * x
    return res_grad
```

FIG. 1

(Prior Art)

<u>400</u>

Obtain a first expression and a second expression of a program, where both the first expression and the second expression include a first variable, the first variable is an input variable in the first expression, the first variable is an output variable in the second expression, and an operation type of the first variable in the first expression is different from an operation type of the first variable in the second expression    S410

↓

Update the operation type of the first variable in the first expression and/or the operation type of the first variable in the second expression, so that an updated operation type of the first variable is consistent in the first expression and the second expression, where the updated operation type of the first variable indicates that the first variable has no differentiation result or has a differentiation result of zero after undergoing a differentiation operation    S420

↓

Process the first expression and the second expression based on the updated operation type of the first variable, to obtain a derivative function expression corresponding to the first expression and a derivative function expression corresponding to the second expression    S430

↓

Combine, according to a chain rule, the derivative function expression corresponding to the first expression and the derivative function expression corresponding to the second expression, to obtain a compilation result of the program, where the compilation result of the program is related to a combination result of the derivative function expression corresponding to the first expression and the derivative function expression corresponding to the second expression    S440

FIG. 4

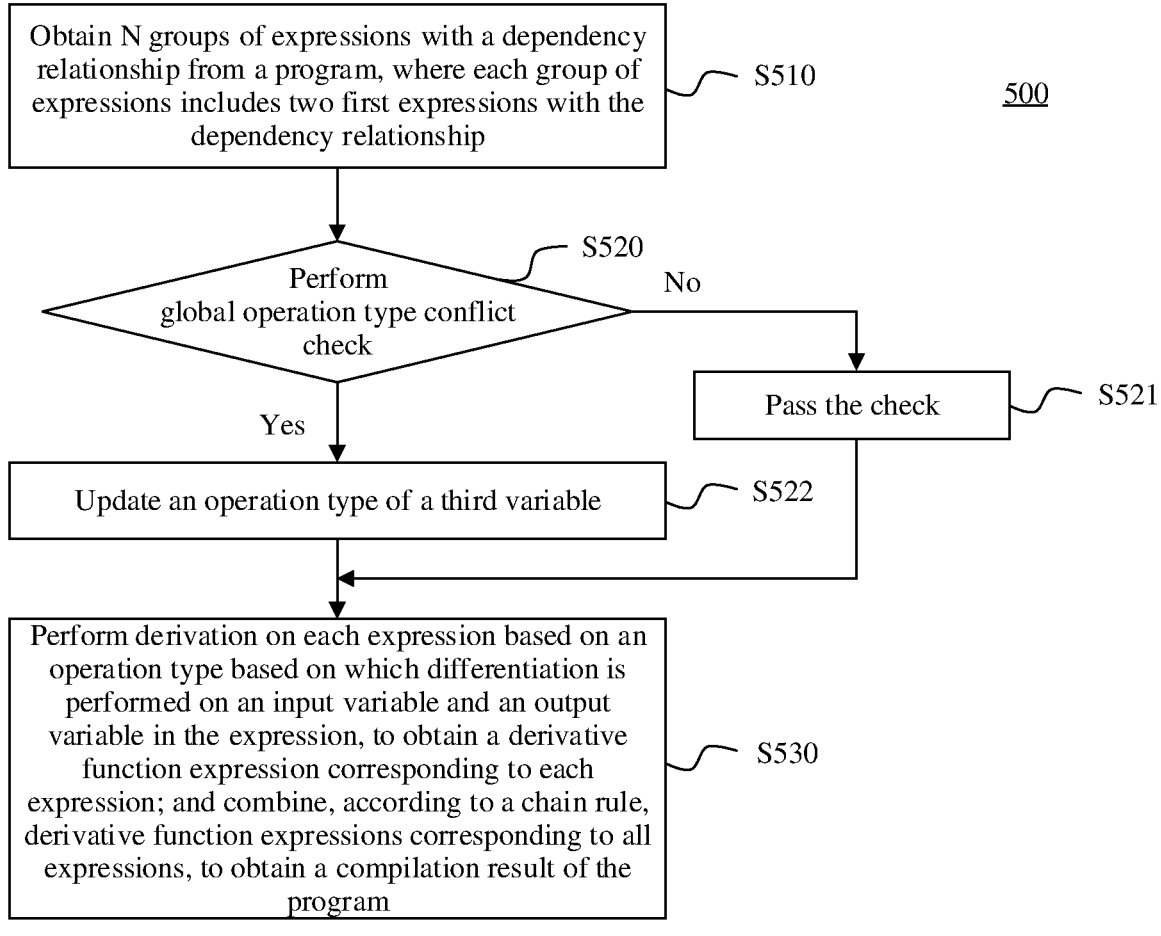

Obtain N groups of expressions with a dependency relationship from a program, where each group of expressions includes two first expressions with the dependency relationship          S510

500

Perform global operation type conflict check          S520

No

Pass the check          S521

Yes

Update an operation type of a third variable          S522

Perform derivation on each expression based on an operation type based on which differentiation is performed on an input variable and an output variable in the expression, to obtain a derivative function expression corresponding to each expression; and combine, according to a chain rule, derivative function expressions corresponding to all expressions, to obtain a compilation result of the program          S530

FIG. 5

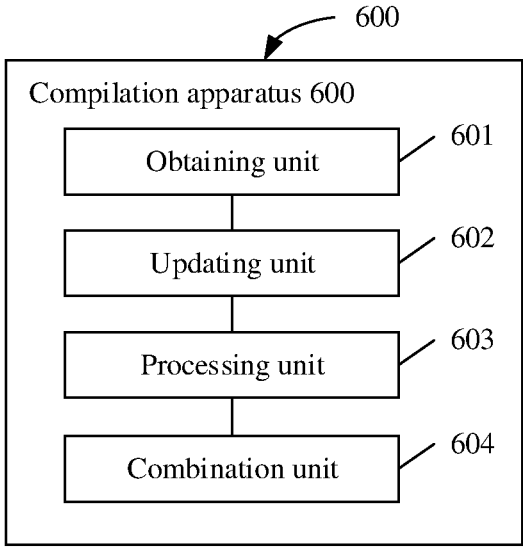

600

Compilation apparatus 600

Obtaining unit          601

Updating unit          602

Processing unit          603

Combination unit          604

FIG. 6

PROGRAM COMPILATION METHOD AND APPARATUS

CROSS-REFERENCE TO RELATED APPLICATIONS

This application is a continuation of International Application No. PCT/CN2022/101345, filed on Jun. 25, 2022, which claims priority to Chinese Patent Application No. 202110742873.X, filed on Jun. 30, 2021. The disclosures of the aforementioned applications are hereby incorporated by reference in their entireties.

TECHNICAL FIELD

This technology relates to the field of information technologies, and in particular, to a program compilation method and apparatus.

BACKGROUND

A derivative is an important basic concept in mathematics. A derivative of a function at a point describes a change rate of the function near the point. Automatic differentiation (AD for short) is a method of automatically completing function "derivation" (differentiation) by a computer program. However, for a function on which derivation needs to be performed, a mathematical expression of the function cannot be understood and read by a computer. Therefore, a user needs to first define the function by using a programming language, to obtain a program expression that can be understood by a computer; and then perform, by using a compilation system, derivation on the function expressed by using the programming language (this process may also be referred to as compilation). In a derivation process, the compilation system can correctly process a part that is in the program expression and that is different from the mathematical expression.

However, in a process of performing derivation on a program, an existing compilation system cannot deal with a scenario in which a variable in an expression of the program has an operation type conflict, to be specific, a variable is an input variable of an expression and an output variable of another expression, and the variable is differential in an expression and is not differential in another expression. As a result of such a conflict, a compiled program includes redundant code, which severely affects running performance of the compiled program, and furthermore, a user spends a large amount of time on debugging.

SUMMARY

Embodiments provide a program compilation method and apparatus, so as to simplify an expression of a compiled program, and improve running performance of the compiled program.

According to a first aspect, this application provides a program compilation method. The method includes: obtaining a first expression and a second expression of a program, where both the first expression and the second expression include a first variable, the first variable is an input variable in the first expression, the first variable is an output variable in the second expression, and an operation type of the first variable in the first expression is different from an operation type of the first variable in the second expression: updating the operation type of the first variable in the first expression and/or the operation type of the first variable in the second expression, so that an updated operation type of the first variable is consistent in the first expression and the second expression, where the updated operation type of the first variable indicates that the first variable has no differentiation result or has a differentiation result of zero after undergoing a differentiation operation: processing the first expression and the second expression based on the updated operation type of the first variable, to obtain a derivative function expression corresponding to the first expression and a derivative function expression corresponding to the second expression; and combining, according to a chain rule, the derivative function expression corresponding to the first expression and the derivative function expression corresponding to the second expression, to obtain a compilation result of the program, where the compilation result of the program is related to a combination result of the derivative function expression corresponding to the first expression and the derivative function expression corresponding to the second expression.

In terms of an effect, when the first variable has no differentiation result after undergoing the differentiation operation, the compilation result of the program does not include an item corresponding to the first variable. In other words, when an operation type of a variable indicates that the variable has no differentiation result after undergoing a differentiation operation, if derivation is performed on the variable, the variable is deleted, or a differentiation result is represented by an identifier. When the variable is represented by the identifier after derivation is performed on the variable, the identifier has no compilation result, that is, the compilation result of the program does not include an item corresponding to such a character. To be specific, when the first variable has no differentiation result after undergoing the differentiation operation, the compilation result of the program does not include the item corresponding to the first variable, so that the compilation result of the program does not include redundant code, thereby effectively improving running performance of the compilation result of the program.

Optionally, the program may further include a plurality of groups of expressions, and a relationship between two expressions in each group of expressions is the same as a relationship between the first expression and the second expression. The relationship is as follows: In each group of expressions, one expression and the other expression include a same variable, and the variable is an input variable in one expression and an output variable in the other expression. In this embodiment, such a relationship is referred to as a dependency relationship, that is, the first expression and the second expression have the dependency relationship, or the dependency relationship is generated between the first expression and the second expression based on the first variable.

Optionally, the first expression and the second expression may be any one of the plurality of groups of expressions with the dependency relationship in the program. The compilation result of the program is obtained based on a combination of derivative function expressions corresponding to all expressions in the program. In this case, the compilation result of the program is related to the combination result of the derivative function expression corresponding to the first expression and the derivative function expression corresponding to the second expression. A processing process of each group of expressions with the dependency relationship is correspondingly the same as a processing process of the first expression and the second expression.

Optionally, a compiler/compilation system may use any identifier, for example, a character, a character string, or another feasible identifier, to represent the operation type of the first variable. Further, when the operation type of the first variable in the first expression conflicts with (that is, is different from) the operation type of the first variable in the second expression, the operation type of the first variable in the first expression may be represented by a first character, and the operation type of the first variable in the second expression may be represented by a second character. The updated operation type of the first variable may be represented by a third character, that is, in this case, the first character and the second character need to be updated at the same time. When the updated operation type of the first variable is represented by the first character or the second character, the first character or the second character is updated. The updated first character, the updated second character, or the updated third character indicates that the first variable has no differentiation result or has the differentiation result of zero after undergoing the differentiation operation.

Optionally, when the first variable has no differentiation result after undergoing the differentiation operation, a differentiation result may be represented by an identifier, for example, a character, where the character may be a character "null" or another character.

It should be understood that, when the first variable is an output variable in the first expression, and the first variable is an input variable in the second expression, a compilation process of the program is correspondingly the same as the foregoing compilation process of the program in this embodiment.

It can be learned that, in this embodiment, because the first variable is the input variable in the first expression, and the first variable is the output variable in the second expression, in the compilation process of the program, a differentiation result of the first variable in the first expression and a differentiation result of the first variable in the second expression are combined according to the chain rule. In this case, when the first variable has no differentiation result or has the differentiation result of zero in one expression, for the compilation process of the entire program, the differentiation operation does not need to be performed on the first variable in the other expression. In this embodiment, the operation types of the first variable in the first expression and the second expression may be checked in advance. When the operation type of the first variable in the first expression is different from the operation type of the first variable in the second expression, the operation type of the first variable in the first expression and/or the operation type of the first variable in the second expression are/is updated. Because the updated operation type of the first variable indicates that the first variable has no differentiation result or has the differentiation result of zero after undergoing the differentiation operation, when the first expression and the second expression are separately processed based on the updated operation type of the first variable, the differentiation operation is not performed on the first variable, that is, the differentiation results of the first variable in the first expression and the second expression are omitted, so that the derivative function expressions respectively corresponding to the first expression and the second expression can be simplified. Then, all other groups of expressions with the dependency relationship in the program are processed based on processing of the first expression and the second expression, to simplify derivative function expressions corresponding to the other expressions. In this way, the program compilation result obtained by combining, according to the chain rule, the derivative function expressions corresponding to all the expressions in the program does not include redundant code, thereby effectively improving running performance of the compilation result of the program.

In a feasible implementation, when the updated operation type of the first variable is differentiation, the first variable has the differentiation result of zero after undergoing the differentiation operation.

Optionally, the operation type of the first variable is differentiation or non-differentiation. Differentiation means that the compiler/compilation system that runs this method performs the differentiation operation on the first variable. Non-differentiation means that the compiler/compilation system that runs this method does not perform the differentiation operation on the first variable.

It can be learned that, in this embodiment, the differentiation result of the first variable is zero in the program compilation result obtained by combining, according to the chain rule, the derivative function expression corresponding to the first expression and the derivative function expression corresponding to the second expression. Therefore, during processing of the first expression and the second expression, the differentiation results of the first variable in the first expression and the second expression are omitted, so that the derivative function expressions respectively corresponding to the first expression and the second expression can be simplified, thereby simplifying the compilation result of the program, and effectively improving running performance of the compilation result of the program.

In a feasible implementation, when the updated operation type of the first variable is non-differentiation, the first variable has no differentiation result after undergoing the differentiation operation.

It can be learned that, in this embodiment, the first variable has no differentiation result in the program compilation result obtained by combining, according to the chain rule, the derivative function expression corresponding to the first expression and the derivative function expression corresponding to the second expression. Therefore, during processing of the first expression and the second expression, the differentiation operation is not performed on the first variable in the first expression and the second expression, so that the derivative function expressions respectively corresponding to the first expression and the second expression can be simplified, thereby simplifying the compilation result of the program, and effectively improving running performance of the compilation result of the program.

In a feasible implementation, when a user requires that a derivative of a first output variable of the program with respect to a first input variable of the program be output, and the derivative is obtained based on a combination of the differentiation results of the first variable, warning information is generated, where the warning information indicates locations of the first expression and the second expression in the program, and the first variable.

Optionally, the program may include at least one input variable and/or at least one output variable. The at least one input variable includes the first input variable, and the at least one output variable includes the first output variable.

It can be learned that, in this embodiment, when the first variable has no differentiation result after undergoing the differentiation operation, and the derivative of the first output variable with respect to the first input variable is obtained based on the combination of the differentiation results of the first variable, a conflict with a user requirement occurs because the derivative also has no result. In this case, the warning information is generated to indicate the locations of the first expression and the second expression in the program, and the first variable, so that the user can quickly locate problematic code and perform corresponding modification.

In a feasible implementation, the operation type of the first variable in the first expression is determined by a mathematical calculation rule indicated by semantics of the first expression, and the operation type of the first variable in the second expression is determined by a mathematical calculation rule indicated by semantics of the second expression.

Optionally, the mathematical calculation rule represents a sequence of operations included in the expression and operation types of the operations. For example, the operation type may be condition judgment, addition, subtraction, multiplication, or division.

In a feasible implementation, when the first expression or the second expression is a conditional statement or a loop statement, and the first variable is located in a condition selection expression of the conditional statement or a loop control expression of the loop statement, the operation type of the first variable is non-differentiation.

It can be learned that, in this embodiment, after the operation type of the first variable is determined based on the mathematical calculation rule included in the semantics of the expression, when the operation type of the first variable in the first expression is different from the operation type of the first variable in the second expression, the operation type of the first variable is updated, and then the expressions are processed based on the updated operation type of the first variable, so that the derivative function expressions corresponding to the expressions are simplified, thereby simplifying the compilation result of the program.

According to a second aspect, this application provides a compilation apparatus. The apparatus includes: an obtaining unit, configured to obtain a first expression and a second expression of a program, where both the first expression and the second expression include a first variable, the first variable is an input variable in the first expression, the first variable is an output variable in the second expression, and an operation type of the first variable in the first expression is different from an operation type of the first variable in the second expression: an updating unit, configured to update the operation type of the first variable in the first expression and/or the operation type of the first variable in the second expression, so that an updated operation type of the first variable is consistent in the first expression and the second expression, where the updated operation type of the first variable indicates that the first variable has no differentiation result or has a differentiation result of zero after undergoing a differentiation operation: a processing unit, configured to process the first expression and the second expression based on the updated operation type of the first variable, to obtain a derivative function expression corresponding to the first expression and a derivative function expression corresponding to the second expression; and a combination unit, configured to combine, according to a chain rule, the derivative function expression corresponding to the first expression and the derivative function expression corresponding to the second expression, to obtain a compilation result of the program, where the compilation result of the program is related to a combination result of the derivative function expression corresponding to the first expression and the derivative function expression corresponding to the second expression.

In a feasible implementation, when the updated operation type of the first variable is differentiation, the first variable has the differentiation result of zero after undergoing the differentiation operation.

In a feasible implementation, when the updated operation type of the first variable is non-differentiation, the first variable has no differentiation result after undergoing the differentiation operation.

In a feasible implementation, when a user requires that a derivative of a first output variable of the program with respect to a first input variable of the program be output, and the derivative is obtained based on a combination of differentiation results of the first variable, warning information is generated, where the warning information indicates locations of the first expression and the second expression in the program, and the first variable.

In a feasible implementation, the operation type of the first variable in the first expression is determined by a mathematical calculation rule indicated by semantics of the first expression, and the operation type of the first variable in the second expression is determined by a mathematical calculation rule indicated by semantics of the second expression.

In a feasible implementation, when the first expression or the second expression is a conditional statement or a loop statement, and the first variable is located in a condition selection expression of the conditional statement or a loop control expression of the loop statement, the operation type of the first variable is non-differentiation.

According to a third aspect, this application provides a chip system. The chip system includes at least one processor, a memory, and an interface circuit. The memory, the interface circuit, and the at least one processor are interconnected by using a line. The at least one memory stores instructions. When the instructions are executed by the processor, the method according to any one of the first aspect or the implementations of the first aspect is implemented.

According to a fourth aspect, this application provides a compilation apparatus. The apparatus includes the chip system according to the third aspect and a discrete device coupled to the chip system.

According to a fifth aspect, this application provides a computer-readable storage medium. The computer-readable medium stores program code for execution by a device, and the program code is used to perform the method according to any one of the first aspect or the implementations of the first aspect.

According to a sixth aspect, this application provides a computer program product. The computer program product includes program instructions. When the program instructions are run on a computer, the method according to any one of the first aspect or the implementations of the first aspect is implemented.

BRIEF DESCRIPTION OF DRAWINGS

The following describes accompanying drawings used in embodiments.

FIG. 1 is a schematic diagram of derivation processes corresponding to a mathematical expression and a program expression in a conventional technology;

FIG. 4 is a schematic flowchart of a program compilation method according to an embodiment:

FIG. 5 is a schematic diagram of an execution process of a program compilation method according to an embodiment:

FIG. 6 is a schematic diagram of a structure of a compilation apparatus according to an embodiment.

DESCRIPTION OF NON-LIMITING EXAMPLE EMBODIMENTS

Figure 2:
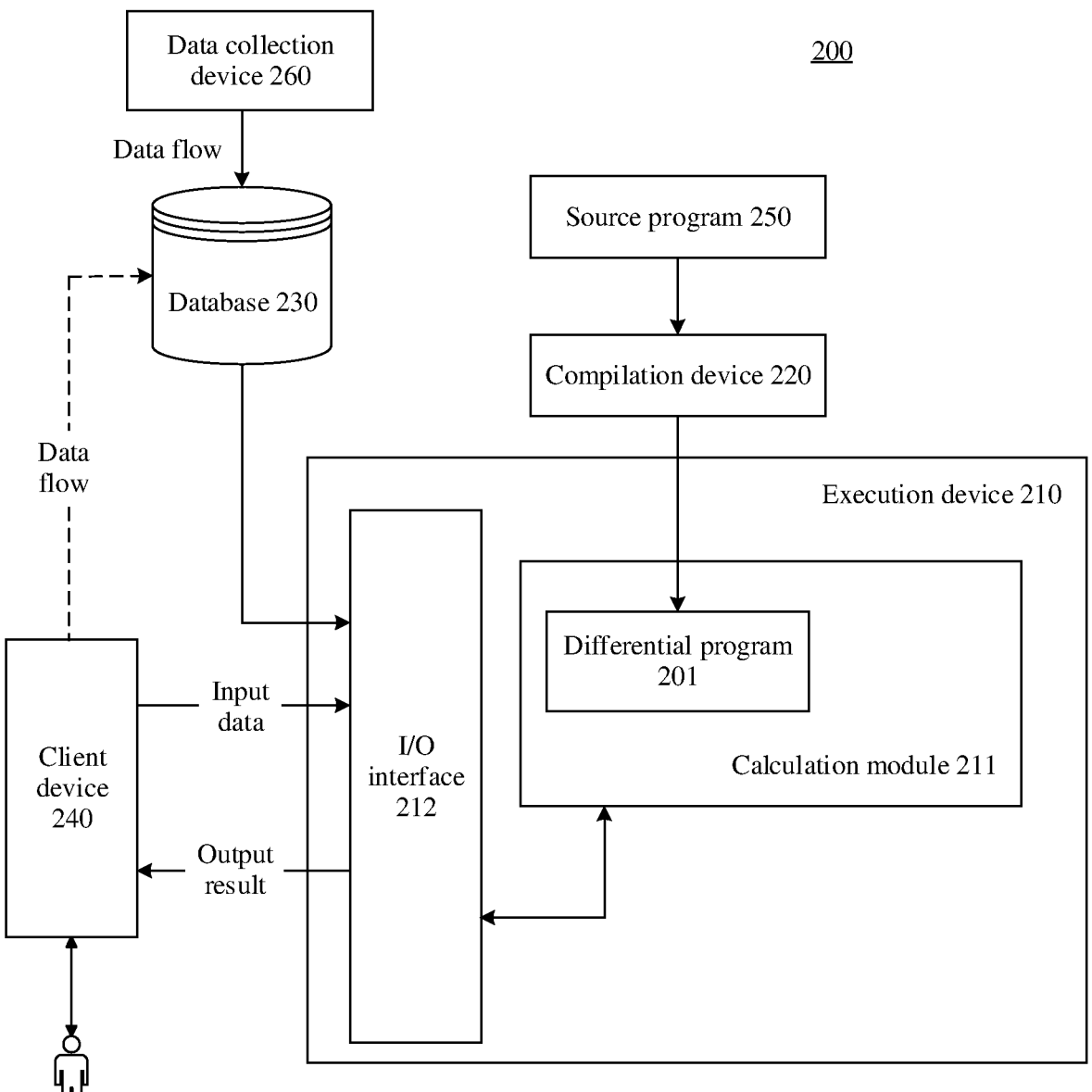
FIG. 2 is a schematic diagram of a system architecture according to an embodiment.

The following describes embodiments with reference to the accompanying drawings in embodiments.

It should be understood that technical solutions in embodiments may be applied to various computer systems, for example, a personal computer (personal computer, PC), a computer cluster system, a mainframe computer system, or various supercomputers (supercomputer). This is not limited in this specification. In addition, this application may be further applied without limitation to various compilers, for example, a GNU compiler collection (GCC) and a low level virtual machine (LLVM).

The following describes related termsin this specification.

(1) Chain rule: A chain rule is a rule for finding a derivative of a composite function. For example, it is assumed that f and g are two derivable functions about x. In this case, a derivative of a composite function f(g(x)) is f(g(x))*g'(x).

(2) Expression: An expression is an independent element in a programming language, and represents some actions to be executed by a program.

(3) Recursion: Mathematically, recursion is an operation of using a function itself in a definition of the function.

(4) Loop: A loop is an expression that appears only once in a program but may be consecutively executed for a plurality of times.

(5) Compilation: Compilation is a process of converting one type of source code into another type of source code.

First, mathematical function derivation and an automatic differentiation (AD) technology for a program that are related to this application are described. In embodiments, a letter d represents differentiation performed on a variable. For example, differentiation of a variable x may be represented as dx, and a derivative of a variable A with respect to a variable E may be represented as dA/dE.

Mathematically, a process of finding a derivative of a known function at a point or a derivative function of the known function is referred to as derivation. For example, a derivative of a function f(x) at a point at which an independent variable x is equal to $x_0$ may be denoted as f'($x_0$). Therefore, for the derivable function f(x), x→f'(x) is also a function, which is referred to as a derivative function of f(x). A basic process of function derivation in mathematics is as follows:

(1) A mathematical expression of a function is given, and the mathematical expression is continuously decomposed into a combination of sub mathematical operations (such as addition, subtraction, multiplication, and division) for which derivation rules have been defined mathematically.

(2) Derivation is performed on each sub mathematical operation according to a basic mathematical derivation rule.

(3) Derivation results of the sub mathematical operations are combined according to the chain rule, to obtain a derivative function of the function.

Automatic differentiation AD is a method in which a computer program automatically completes the foregoing process to calculate a derivative of a function. However, for a function on which derivation needs to be performed, a mathematical expression of the function cannot be understood and read by a computer. Therefore, a user needs to first define the function by using a programming language, to obtain a program expression that can be understood by a computer. It should be noted that a mathematical expression of a function is different from a program expression in a programming language.

FIG. 1 is a schematic diagram of derivation processes corresponding to a mathematical expression and a program expression in a conventional technology. The following describes the processes of derivation of the mathematical expression and derivation of the program expression based on an example in FIG. 1.

In FIG. 1, the program expression 1 is a programming-language expression corresponding to the mathematical expression 1. In the mathematical expression 1, recursion implicitly exists in the expression, and therefore, no special processing needs to be performed during derivation. However, when applied to the program expression, recursion is mapped to a parameter n that explicitly exists in the program expression 1 and a loop expression "for" that implements recursion. In a process of derivation of the program expression 1, derivation actually needs to be performed on a multiplication operation inside the loop expression, whereas the parameter n and a control part "for" (i in 0 to n−1) that is in the loop expression and that is used to determine whether a loop continues need to be ignored and do not need undergo derivation. Otherwise, a compilation system generates an incorrect derivation result.

In the program expression 1, a main function is f, which includes two input variables x and n, and a return value of the main function f is res.

In a derivative function expression corresponding to the program expression 1, a main function is f_grad, and the main function includes two input variables x and n. A derivation result of an expression res=x for x is an expression res_grad=1. The control part "for" (i in 0 to n−1) of the loop expression is ignored and does not undergo derivation. A derivative function expression of an output variable of the main function f grad with respect to the input variable x is res_grad=res_grad*x+res. A meaning represented by the character "grad" is derivation. A return value of the main function f_grad is res_grad.

When a compiler in a conventional technology performs compilation (derivation) on a to-be-compiled program, the derivation is performed only for a current expression obtained through decomposition. For example, in the derivation process of the program expression 1, the program expression 1 is first decomposed into two expressions: res=x and the loop expression, and then derivation is performed on each of the two expressions. Therefore, there is a part that can be simplified (that is, a part res_grad in res_grad*x, where a value of the part is 1) in the derivative function expression res_grad corresponding to the main function.

To sum up, in the conventional technology, in a program compilation process, processing is performed only for a single expression obtained through decomposition, and then derivation results of all expressions are combined based on the chain derivation rule, in which case an obtained derivative function expression includes redundant code, resulting in comparatively poor running performance of a compiled program.

The following describes a system architecture and an application scenario in embodiments.

FIG. 2 is a schematic diagram of a system architecture according to an embodiment. As shown in the system architecture 200, a data collection device 260 is configured to collect data. The data in this embodiment includes image data in the artificial intelligence field, speech and semantic data in natural language processing, or data used for differential calculation of a source program 250 in another field (such as scientific computing or physical modeling). This is not limited in this specification.

After collecting the data, the data collection device 260 stores the data in a database 230.

A compilation device 220 compiles the source program 250 (that is, a program in embodiments) to obtain a differential program 201 (that is, a compilation result of the program in embodiments). Data used by the differential program is maintained based on the database 230. The compilation device 220 may be any device that includes a compiler (for example, a compiler such as a GCC or an LLVM).

The following describes in detail, based on an embodiment shown in FIG. 4, a process of compiling the source program 250 by the compilation device 220.

The differential program 201 obtained through compilation by the compilation device 220 may be applied to different systems or devices, for example, applied to an execution device 210 shown in FIG. 2. The execution device 210 may be a terminal, such as a mobile phone terminal, a tablet computer, a notebook computer, augmented reality (augmented reality, AR)/virtual reality (virtual reality, VR), or a vehicle-mounted terminal, or may be a server, a cloud, or the like. In FIG. 2, the execution device 210 is provided with an input/output (input/output, I/O) interface 212, which is configured to exchange data with an external device.

The execution device 210 may receive data that is in the database 230 or that is input by a client device 240, and perform a related calculation process in the differential program by using a calculation module 211, to process the input data, so as to obtain a processing result corresponding to the input data.

Finally, the I/O interface 212 returns the processing result (which is, for example, a category label of an image in image recognition, or a target identified from an image in a target detection scenario) to the client device 240, to provide the processing result for a user.

It should be noted that the compilation device 220 may compile source programs implementing different objectives or different tasks, to obtain corresponding differential programs 201, and then process, by using the differential programs, data used for the different objectives or the different tasks, to provide a required processing result for the user.

In a case shown in FIG. 2, the user may manually give the input data, and the manual giving may be performed by using an interface provided by the I/O interface 212. In another case, the client device 240 may automatically send the input data to the I/O interface 212. If the client device 240 is required to obtain authorization from the user to automatically send the input data, the user may set corresponding permission on the client device 240. The user may view, on the client device 240, a result output by the execution device 210. The result may be specifically presented in a form of a display, a sound, an action, or the like. The client device 240 may also serve as a data collection end to collect, as new sample data, the input data that is input to the I/O interface 212 and the output result that is output from the I/O interface 212 that are shown in the figure, and store the collected data in the database 230.

It should be noted that FIG. 2 is merely a schematic diagram of a system architecture according to an embodiment, and a location relationship between devices, components, modules, or the like shown in the figure does not constitute any limitation. For example, in FIG. 2, the compilation device 220 is an external device relative to the execution device 210, but in another case, the compilation device 220 may be alternatively disposed in the execution device 210. The execution device 210 is an external device relative to the client device 240, but in another case, the execution device 210 and the client device 240 may be the same device.

Figure 3:
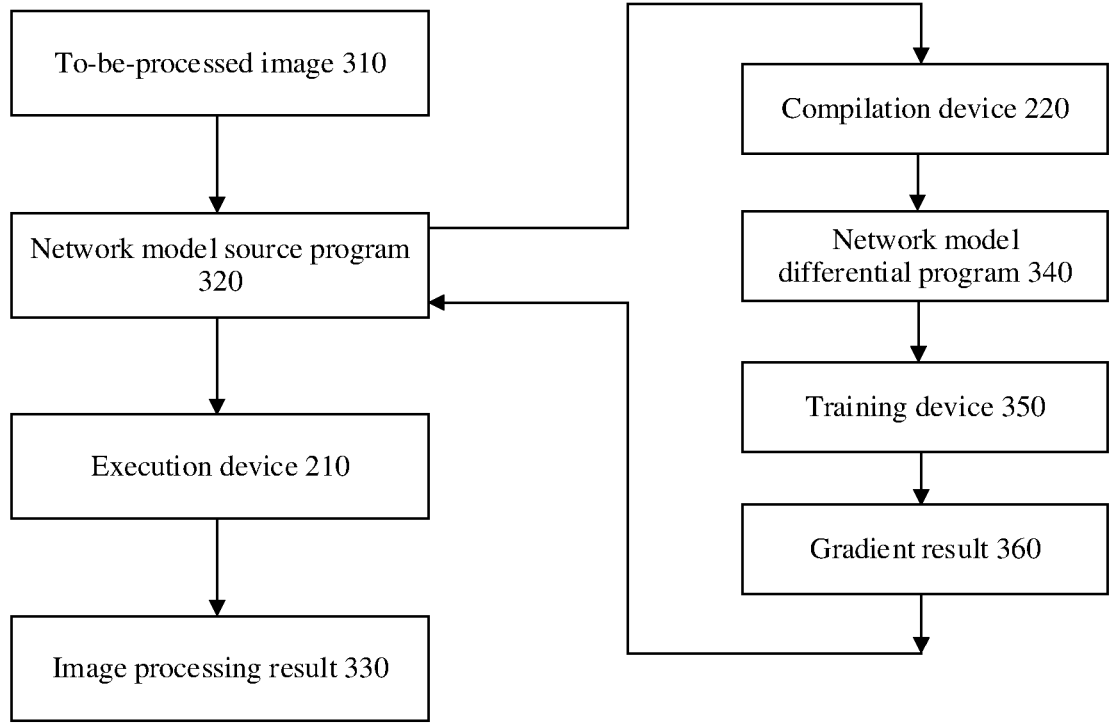
FIG. 3 is a schematic diagram of an application scenario according to an embodiment.

FIG. 3 is a schematic diagram of an application scenario according to an embodiment. It should be understood that a compilation method in embodiments may be applied to scenarios in which differential calculation needs to be performed in fields including artificial intelligence, scientific computing, physical modeling, and the like. In FIG. 3, a deep learning-based image processing scenario (for example, image recognition, target detection, or image segmentation) in the artificial intelligence field is used as an example to describe an application process of the compilation method in embodiments.

First, a user designs a deep learning-based network model source program 320 (corresponding to the source program 250 in FIG. 2) based on a specific image processing scenario, and then trains a network model by using the compilation method in embodiments, to obtain a trained network model. Details are as follows:

The compilation device 220 performs the compilation method in embodiments to compile the network model source program, to obtain a network model differential program 340 (corresponding to the differential program 201 in FIG. 2). A training device 350 performs a corresponding calculation process in the network model differential program 340 to process an image sample in a training set, so as to obtain a gradient result 360 of a single training process, and updates the network model by using the gradient result 360. The network model is trained for a plurality of times until the model is converged, to obtain the trained network model.

After the trained network model is obtained, the execution device 210 runs the trained network model to process a to-be-processed image 310, so as to obtain a corresponding image processing result 330 (for example, the processing result is a category label of the image in image recognition, the processing result is a target identified from the image in target detection, or the processing result is a segmentation result of the image in image segmentation).

It should be understood that, in FIG. 3, the compilation device 220 is an external device relative to the execution device 210 and the training device 350, but in another case, the compilation device 220 may be alternatively disposed in the execution device 210, or the compilation device 220 may be disposed in the training device 350.

FIG. 4 is a schematic flowchart of a program compilation method 400 according to an embodiment. The method 400 includes steps S410, S420, S430, and S440.

Step S410: Obtain a first expression and a second expression of a program, where both the first expression and the second expression include a first variable, the first variable is an input variable in the first expression, the first variable is an output variable in the second expression, and an operation type of the first variable in the first expression is different from an operation type of the first variable in the second expression.

Optionally, expressions in the program may be classified into a basic mathematical expression, a control flow expression, and a function expression.

The basic mathematical expression may be a basic operation expression of addition, subtraction, multiplication, division, or the like, or an expression obtained by combining at least two of basic operation expressions. The control flow expression is used to control whether the program performs an operation. For example, the control flow expression may be a conditional branch expression or a loop expression. The function expression may be a library function defined in various programming languages, a user-defined function, or the like, and may be an ordinary function or an anonymous function. It should be understood that a person skilled in the art may classify the expressions in the program in another manner. This is not limited in this specification.

Specifically, the first expression and the second expression may be basic mathematical expressions, control flow expressions, or function expressions described above. The first expression and the second expression include at least one input variable and/or at least one output variable.

Optionally, the program may further include a plurality of groups of expressions, and a relationship between two expressions in each group of expressions is the same as a relationship between the first expression and the second expression. The relationship is as follows: In each group of expressions, one expression and the other expression include a same variable, and the variable is an input variable in one expression and an output variable in the other expression. In this embodiment, such a relationship is referred to as a dependency relationship, that is, the first expression and the second expression have the dependency relationship, or the dependency relationship is generated between the first expression and the second expression based on the first variable.

Optionally, the first expression and the second expression may be any one of the plurality of groups of expressions with the dependency relationship in the program. A compilation result of the program is obtained based on a combination of derivative function expressions corresponding to all the expressions in the program. In this case, the compilation result of the program is related to a combination result of a derivative function expression corresponding to the first expression and a derivative function expression corresponding to the second expression. A processing process of each group of expressions with the dependency relationship is correspondingly the same as a processing process of the first expression and the second expression.

It should be understood that, when the first variable is an output variable in the first expression, and the first variable is an input variable in the second expression, a compilation process of the program is correspondingly the same as the foregoing compilation process of the program in this embodiment.

Step S420: Update the operation type of the first variable in the first expression and/or the operation type of the first variable in the second expression, so that an updated operation type of the first variable is consistent in the first expression and the second expression, where the updated operation type of the first variable indicates that the first variable has no differentiation result or has a differentiation result of zero after undergoing a differentiation operation.

Optionally, a compiler/compilation system may use any character, any character string, or any other feasible symbol to represent the operation type of the first variable. Further, when the operation type of the first variable in the first expression conflicts with (that is, is different from) the operation type of the first variable in the second expression, the operation type of the first variable in the first expression may be represented by a first character, and the operation type of the first variable in the second expression may be represented by a second character. The updated operation type of the first variable may be represented by a third character, that is, in this case, the first character and the second character need to be updated at the same time. When the updated operation type of the first variable is represented by the first character or the second character, the first character or the second character is updated. The updated first character, the updated second character, or the updated third character indicates that the first variable has no differentiation result or has the differentiation result of zero after undergoing the differentiation operation.

Optionally, when the first variable has no differentiation result after undergoing the differentiation operation, a differentiation result may be represented by an identifier, for example, a character, where the character may be a character "null" or another character.

The following describes in detail four scenarios in which the operation type of the first variable in the first expression conflicts with the operation type of the first variable in the second expression, as shown in Table 1.

Conflict 1: The first variable is the input variable in the first expression, and the operation type of the first variable in the first expression is differentiation, whereas the first variable is the output variable in the second expression, and the operation type of the first variable in the second expression is non-differentiation.

Conflict 2: The first variable is the input variable in the first expression, and the operation type of the first variable in the first expression is non-differentiation, whereas the first variable is the output variable in the second expression, and the operation type of the first variable in the second expression is differentiation.

Conflict 3: The first variable is the output variable in the first expression, and the operation type of the first variable in the first expression is differentiation, whereas the first variable is the input variable in the second expression, and the operation type of the first variable in the second expression is non-differentiation.

Conflict 4: The first variable is the output variable in the first expression, and the operation type of the first variable in the first expression is non-differentiation, whereas the first variable is the input variable in the second expression, and the operation type of the first variable in the second expression is differentiation.

In a feasible implementation, when the updated operation type of the first variable is differentiation, the first variable has the differentiation result of zero after undergoing the differentiation operation.

Optionally, the operation type of the first variable is differentiation or non-differentiation. Differentiation means that the compiler/compilation system that runs this method performs the differentiation operation on the first variable. Non-differentiation means that the compiler/compilation system that runs this method does not perform the differentiation operation on the first variable.

It can be learned that, in this embodiment, the differentiation result of the first variable is zero in the program compilation result obtained by combining, according to a chain rule, the derivative function expression corresponding to the first expression and the derivative function expression corresponding to the second expression. Therefore, during processing of the first expression and the second expression, differentiation results of the first variable in the first expression and the second expression are omitted, so that the derivative function expressions respectively corresponding to the first expression and the second expression can be simplified, thereby simplifying the compilation result of the program, and effectively improving running performance of the compilation result of the program.

TABLE 1

| Operation type conflict of the first variable in the first expression and the second expression with the dependency relationship | | | | |
|---|---|---|---|---|
| Variable operation type conflict | Operation type of the first variable in the first expression | Operation type of the first variable in the second expression | Updated operation type (two types) of the first variable | |
| Conflict 1 | Input variable Differentiation | Output variable Non-differentiation | Differentiation | Non-differentiation |
| Conflict 2 | Input variable Non-differentiation | Output variable Differentiation | Differentiation | Non-differentiation |
| Conflict 3 | Output variable Differentiation | Input variable Non-differentiation | Differentiation | Non-differentiation |
| Conflict 4 | Output variable Non-differentiation | Input variable Differentiation | Differentiation | Non-differentiation |

In a feasible implementation, when the updated operation type of the first variable is non-differentiation, the first variable has no differentiation result after undergoing the differentiation operation.

Specifically, when the first variable has no differentiation result after undergoing the differentiation operation, the compilation result of the program does not include an item corresponding to the first variable.

The following uses the first variable as an example to describe in detail how to update the operation type of the first variable.

Specifically, for the first expression and the second expression that have the dependency relationship, when the operation type of the first variable in the first expression conflicts with the operation type of the first variable in the second expression, the operation type of the first variable may be updated in two manners, as shown in Table 1.

Manner 1: The operation type of the first variable is updated to non-differentiation. In this case, when the operation type of the first variable in the first expression is differentiation, when the first expression is subsequently processed, that is, when differentiation is performed on the first variable based on the updated operation type of the first variable, a differentiation result of the first variable is zero in the derivative function expression corresponding to the first expression; and when the operation type of the first variable in the second expression is differentiation, when the second expression is subsequently processed, that is, when differentiation is performed on the first variable based on the updated operation type of the first variable, a differentiation result of the first variable is zero in the derivative function expression corresponding to the second expression.

Manner 2: The operation type of the first variable is updated to differentiation. In this case, when the operation type of the first variable in the first expression is non-differentiation, when the first expression is subsequently processed, that is, when differentiation is performed on the first variable based on the updated operation type of the first variable, the first variable has no differentiation result in the derivative function expression corresponding to the first expression; and when the initial operation type of the first variable in the second expression is non-differentiation, when the second expression is subsequently processed, that is, when differentiation is performed on the first variable based on the updated operation type of the first variable, the first variable has no differentiation result in the derivative function expression corresponding to the second expression.

It can be learned that, in this embodiment, the first variable has no differentiation result in the program compilation result obtained by combining, according to the chain rule, the derivative function expression corresponding to the first expression and the derivative function expression corresponding to the second expression. Therefore, during processing of the first expression and the second expression, the differentiation operation is not performed on the first variable in the first expression and the second expression, so that the derivative function expressions respectively corresponding to the first expression and the second expression can be simplified, thereby simplifying the compilation result of the program, and effectively improving running performance of the compilation result of the program.

In a feasible implementation, when a user requires that a derivative of a first output variable of the program with respect to a first input variable of the program be output, and the derivative is obtained based on a combination of differentiation results of the first variable, warning information is generated, where the warning information indicates locations of the first expression and the second expression in the program, and the first variable.

Optionally, the program may include at least one input variable and/or at least one output variable. The at least one input variable includes the first input variable, and the at least one output variable includes the first output variable. In a compilation process, a derivative of each output variable with respect to each input variable is generated. To be specific, when output variables of the program are A and B, and input variables of the program are E and F, derivatives of all the output variables with respect to all the input variables are generated in the compilation process, where the derivatives are $dA/dE$, $dA/dF$, $dB/dE$, and $dB/dF$. The user may select to-be-retained derivation results based on a specific scenario. For example, $dA/dE$, $dA/dF$, and $dB/dE$ are retained. In this case, in a derivative function expression corresponding to a first program, $res\_grad = dA/dE + dA/dF + dB/dE$, where $res\_grad$ is an output of the first program.

Specifically, during calculation of the derivative $dA/dF$ of the first output variable A with respect to the first input variable F of the program, the differentiation results of the first variable in the first expression and the second expression need to be combined. When the operation type of the first variable in the first expression is different from the operation type of the first variable in the second expression, and the updated operation type of the first variable is non-differentiation, it can be learned from the foregoing descriptions in this embodiment that the first variable has no differentiation result. Therefore, after the differentiation results of the first variable in the first expression and the second expression are combined according to the chain rule, dA/dF does not exist. In this case, the compilation result of the program conflicts with a user requirement, and the compiler/compilation system generates the warning information. The warning information indicates the locations of the first expression and the second expression in the program, and indicates that the operation type of the first variable in the first expression conflicts with (that is, is different from) the operation type of the first variable in the second expression, so that the user can correspondingly modify the first expression and the second expression based on the warning information.

It can be learned that, in this embodiment, when the first variable has no differentiation result after undergoing the differentiation operation, and the derivative of the first output variable with respect to the first input variable is obtained based on the combination of the differentiation results of the first variable, a conflict with the user requirement occurs because the derivative also has no result. In this case, the warning information is generated to indicate the locations of the first expression and the second expression in the program, and the first variable, so that the user can quickly locate problematic code and perform corresponding modification.

In a feasible implementation, the operation type of the first variable in the first expression is determined by a mathematical calculation rule indicated by semantics of the first expression, and the operation type of the first variable in the second expression is determined by a mathematical calculation rule indicated by semantics of the second expression.

Specifically, the semantics of the first expression is recognized based on syntax of the first expression, where the syntax of the first expression is predefined syntax or syntax in an existing programming language: the operation type of the first variable in the first expression is determined based on the mathematical calculation rule included in the semantics of the first expression: the semantics of the second expression is recognized based on syntax of the second expression, where the syntax of the second expression is predefined syntax or syntax in an existing programming language; and the operation type of the first variable in the second expression is determined based on the mathematical calculation rule included in the semantics of the second expression.

The foregoing syntax is a representation form of a program expression in a programming language, that is, a format and specification of the expression. The foregoing syntax may be syntax in an existing programming language, for example, syntax in a language such as Python, C, or C++, or may be user-defined syntax, for example, the user may define syntax x@y. The foregoing semantics is a meaning of an expression in a programming language, that is, a specific operation of the expression. For example, the compiler/compilation system may recognize that semantics corresponding to the syntax x@y is x+y*x+y. Different semantics correspond to different mathematical calculation rules. Operation types of an input variable and output variable included in an expression are obtained based on a mathematical calculation rule included in semantics.

Optionally, the mathematical calculation rule represents a sequence of operations included in the expression and operation types of the operations. For example, the operation type may be condition judgment, addition, subtraction, multiplication, or division.

The following uses two examples to describe a process of obtaining operation types of an output variable and input variable in an expression.

Example 1: For an expression z=(+, x, y), syntax of the expression is a representation form of the expression. The compiler/compilation system recognizes corresponding semantics based on the syntax. The semantics of the expression may be adding up an input variable x and an input variable y to obtain an output variable z, that is, z=x+y. Based on a mathematical calculation rule included in the semantics corresponding to the expression, it is determined that operation types of the input variables and the output variable, that is, operation types of the input variable x, the input variable y, and the output variable z, are differentiation.

Example 2: For an expression z=if(m){x} else {y}, syntax of the expression is a representation form if( ){ } else { } of the expression. The compiler/compilation system recognizes corresponding semantics based on the syntax, where the semantics is determining, based on a condition in parentheses ( ), braces { } whose content is to be executed; and determines operation types of input variables and an output variable based on a mathematical calculation rule included in the semantics corresponding to the expression, where an operation type of an input variable m is non-differentiation, operation types of an input variable x and an input variable y are differentiation, and an operation type of an output variable z is differentiation.

In a feasible implementation, when the first expression or the second expression is a conditional statement or a loop statement, and the first variable is located in a condition selection expression of the conditional statement or a loop control expression of the loop statement, the operation type of the first variable is non-differentiation.

Specifically, the operation type of the first variable is obtained based on a mathematical calculation rule included in semantics of the conditional statement or the loop statement, where the operation type is non-differentiation.

It can be learned that, in this embodiment, after the operation type of the first variable is determined based on the mathematical calculation rule included in the semantics of the expression, when the operation type of the first variable in the first expression is different from the operation type of the first variable in the second expression, the operation type of the first variable is updated, and then the expressions are processed based on the updated operation type of the first variable, so as to simplify the derivative function expressions corresponding to the expressions, and the compilation result of the program.

Step S430: Process the first expression and the second expression based on the updated operation type of the first variable, to obtain the derivative function expression corresponding to the first expression and the derivative function expression corresponding to the second expression.

Specifically, operation types of all input variables and an output variable in the first expression are updated according to the foregoing rule, and then differentiation is performed on each input variable and the output variable respectively based on updated operation types of the variables, to obtain the derivative function expression corresponding to the first expression. Likewise, the derivative function expression corresponding to the second expression is obtained according to a generation process of the derivative function expression corresponding to the first expression.

The following describes in detail how to update operation types of each input variable and the output variable in the first expression.

In the first expression, in addition to the first variable, the first expression may further include another input variable and the output variable, where a second variable is any one of the another input variable and the output variable. A third expression is an expression that generates a dependency relationship with the first expression based on the second variable.

Further, when an operation type of the second variable in the first expression is the same as an operation type of the second variable in the third expression, the operation type of the second variable is not updated: or when an operation type of the second variable in the first expression is different from an operation type of the second variable in the third expression, the operation type of the second variable is updated in a manner that is the same as the updating manner of the operation type of the first variable. During processing of the first expression, differentiation is performed on the second variable based on an updated operation type of the second variable.

It should be understood that the dependency relationship between the first expression and the second expression is generated based on the first variable, and the dependency relationship may also be generated between the first expression and the second expression based on another variable. This is not limited in this specification. When the dependency relationship between the first expression and the second expression is generated based on a plurality of variables, and an operation type of each variable in the first expression is different from an operation type of the variable in the second expression, an updated operation type of each variable is the same as the updated operation type of the first variable.

Likewise, an updating process of an operation type of a variable included in another expression in the program is the same as the updating manner of an operation type of each variable in the first expression. Details are not described herein.

To sum up, after the operation types of all the input variables and the output variable in the first expression are updated according to the foregoing rule, for different types of first expressions, a corresponding processing (derivation) rule may be as follows: recognizing semantic information of the first expression based on the syntax of the first expression, and processing the first expression based on the mathematical calculation rule included in the semantics and the updated operation type of each variable (the input variables and the output variable). Details are as follows:

(1) the First Expression is a Basic Mathematical Expression.

Derivation is performed based on the updated operation type of each variable in the first expression according to a standard mathematical differentiation rule, to obtain the derivative function expression corresponding to the first expression.

(2) the First Expression is a Control Flow Expression.

i. When the control flow expression is a conditional branch expression, during derivation, a subexpression used for condition judgment in the expression is ignored, and only subexpressions in all conditional branches in the expression are traversed and undergo derivation; and then, derivation results of the subexpressions are combined according to the chain rule, to obtain the derivative function expression corresponding to the first expression.

ii. When the control flow expression is a loop expression, a subexpression used for loop condition judgment and updating in the expression is ignored, and only subexpressions in a loop body are traversed and undergo derivation; and then, derivation results of the subexpressions are combined according to the chain rule, to obtain the derivative function expression corresponding to the first expression.

iii. When the control flow expression includes a conditional branch expression and a loop expression, during derivation, derivation may be performed on the conditional branch expression and the loop expression separately, and derivation results are finally combined according to the chain rule, to obtain the derivative function expression corresponding to the first expression.

(3) the First Expression is a Function Expression.

Subexpressions in a function body are traversed, derivation is performed based on an updated operation type of each variable in each subexpression, and then derivation results of the subexpressions are combined according to the chain rule, to obtain the derivative function expression corresponding to the first expression.

For example, when the output variable included in the first expression is a, and the input variables are b, c, and e, after the operation types of each input variable and the output variable are updated according to the foregoing steps, derivatives of the output variable with respect to the input variables are calculated, where the derivatives are $da/db$, $da/dc$, and $da/de$. In this case, a derivation result of the first expression is $res\_grad=da/db+da/dc+da/de$. Finally, the derivation result of the first expression is combined with an expression that does not undergo derivation and that is in the first expression, to obtain the derivative function expression corresponding to the first expression.

Step S440: Combine, according to the chain rule, the derivative function expression corresponding to the first expression and the derivative function expression corresponding to the second expression, to obtain the compilation result of the program, where the compilation result of the program is related to the combination result of the derivative function expression corresponding to the first expression and the derivative function expression corresponding to the second expression.

Optionally, the first expression and the second expression may be any one of the plurality of groups of expressions with the dependency relationship in the program. The compilation result of the program is obtained based on the combination of the derivative function expressions corresponding to all the expressions in the program. In this case, the compilation result of the program is related to the combination result of the derivative function expression corresponding to the first expression and the derivative function expression corresponding to the second expression. The processing process of each group of expressions with the dependency relationship is correspondingly the same as the processing process of the first expression and the second expression.

Specifically, for any group of two expressions with the dependency relationship, for any one of the two expressions, operation types of an input variable and output variable included in the any expression may be updated in the updating manner of the operation types of the input variable and output variable included in the first expression, and then derivation is performed on the any expression based on an updated operation type, to obtain a derivative function expression corresponding to the any expression. Then, a derivative function expression corresponding to each expression in the program is obtained in the foregoing manner in this embodiment, and the derivative function expressions corresponding to all the expressions are combined according to the chain rule, to obtain the compilation result of the program.

To sum up, in the foregoing program compilation process, first, operation types of an input variable and output variable included in each expression are obtained based on semantics of the expression; then, operation types of variables in each pair of expressions with the dependency relationship in the program are updated; and finally, each expression is processed based on an updated operation type of a variable, to obtain a derivative function expression corresponding to the expression, and the derivative function expressions corresponding to all the expressions are combined according to the chain rule, to obtain the compilation result of the program.

It can be learned that, in this embodiment, because the first variable is the input variable in the first expression, and the first variable is the output variable in the second expression, in the compilation process of the program, a differentiation result of the first variable in the first expression and a differentiation result of the first variable in the second expression are combined according to the chain rule. In this case, when the first variable has no differentiation result or has the differentiation result of zero in one expression, for the compilation process of the entire program, the differentiation operation does not need to be performed on the first variable in the other expression. In this embodiment, the operation types of the first variable in the first expression and the second expression may be checked in advance. When the operation type of the first variable in the first expression is different from the operation type of the first variable in the second expression, the operation type of the first variable in the first expression and/or the operation type of the first variable in the second expression are/is updated. Because the updated operation type of the first variable indicates that the first variable has no differentiation result or has the differentiation result of zero after undergoing the differentiation operation, when the first expression and the second expression are separately processed based on the updated operation type of the first variable, the differentiation operation is not performed on the first variable, that is, the differentiation results of the first variable in the first expression and the second expression are omitted, so that the derivative function expressions respectively corresponding to the first expression and the second expression can be simplified. Then, all other groups of expressions with the dependency relationship in the program are processed based on processing of the first expression and the second expression, to simplify derivative function expressions corresponding to the other expressions. In this way, the program compilation result obtained by combining, according to the chain rule, the derivative function expressions corresponding to all the expressions in the program does not include redundant code, thereby effectively improving running performance of the compilation result of the program.

FIG. 5 is a schematic diagram of an execution process of a program compilation method according to an embodiment, and is used as a summary of the embodiment in FIG. 4. As shown in FIG. 5, the process 500 includes steps S510, S520, and S530, which are described as follows:

Step S510: Obtain N groups of expressions with a dependency relationship from a program, where each group of expressions includes two first expressions with the dependency relationship.

For specific descriptions of the dependency relationship, refer to the foregoing embodiment. Details are not described herein again.

Step S520: Perform global operation type conflict check, and update or skip updating operation types of an input variable and output variable in each expression.

Specifically, for each group of two expressions with the dependency relationship, the dependency relationship is generated between the two expressions based on a third variable, and conflict check is performed on operation types of the third variable in the two expressions.

For a manner of obtaining initial operation types of an input variable and output variable in each expression, refer to the descriptions in the foregoing embodiment. Details are not described herein again.

If there is no conflict, step S521 is performed: The check is passed. That is, the third variable passes the type conflict check. In a subsequent processing process of the expression, derivation is performed on the expression based on the operation type of the third variable.

If there is a conflict, step S522 is performed to update the operation type of the third variable. For a specific updating process, refer to a corresponding process in the embodiment in FIG. 4. Details are not described herein again.

Step S530: Perform derivation on each expression based on an operation type based on which differentiation is performed on an input variable and output variable in the expression, to obtain a derivative function expression corresponding to each expression; and combine, according to a chain rule, derivative function expressions corresponding to all expressions, to obtain a compilation result of the program.

For specific descriptions of this process, refer to related descriptions in the embodiment in FIG. 4. Details are not described herein again.

The following specifically describes a compilation process in this specification by using two examples, to show a difference between the compilation method in this specification and a conventional compilation method.

---

Program 1:

```
func f(x: Float64, y: Float64): Float64 {
    auto cond=true Expression ①
    auto trueFunc={( )=>return x+y} Expression ②
    auto falseFunc={( )=>return x−y} Expression ③
    auto func=cond ? trueFunc: falseFunc Expression ④
    return func( )
}
```

---

In a process of compiling the program 1 by using a conventional compilation technology, the program 1 may be divided into four expressions: the expression ①, the expression ②, the expression ③, and the expression ④. In the conventional technology, derivation is performed only on the expressions obtained through division, and global operation type conflict check is not performed. Mathematical operation rules included in semantics of the expression ② and the expression ③ require that derivation of the expression ② and the expression ③ be ignored, that is, initial operation types of an input variable x, an input variable y, an output variable trueFunc, and an output variable falseFunc in the expression ② and the expression ③ are non-differentiation. However, for the expression ④, an output variable of the expression ④ is also an output variable of the program 1, and a user requires that a derivative of the program 1 is output. That is, in this case, operation types of an input variable trueFunc and an input variable falseFunc in the expression ④ are differentiation, which conflicts with the operation types of the output variable trueFunc and the output variable falseFunc in the expression ② and the expression ③. Consequently, a compilation result of the program 1 is incorrect.

In a process of performing compilation by using the method in embodiments of the present invention, likewise, the operation types of the input variable x, the input variable y, the output variable trueFunc, and the output variable falseFunc in the expression ② and the expression ③ are non-differentiation, and the operation types of the input variables trueFunc and falseFunc in the expression ④ are differentiation, in which case an operation type conflict exists. In the compilation method in this specification, global operation type conflict check is performed before derivation, and after the foregoing conflict is detected, a compilation warning is provided for a user, so as to indicate, to the user, specific locations of the expression ②, the expression ③, and the expression ④, and the variables (namely, trueFunc and falseFunc) that generate the operation type conflict. This helps the user modify problematic code in advance.

---

Program 2:

```
func f(x){
    t=x*10 Expression ⑤
    if(t==100){ Expression ⑥
        3*x
    }else{
        2*x
    }
}
```

---

In a process of compiling the program 2 by using the conventional compilation technology, the program 2 may be divided into two expressions: the expression ⑤ and the expression ⑥. The expression ⑤ is t=x*10, and the expression ⑥ is an if condition expression. Operation types of input and output variables in the expression ⑤ are differentiation. A mathematical operation rule included in semantic information of the expression ⑥ indicates to ignore derivation of a judgment statement (t=100) in the if condition expression and perform derivation on two branch expressions. That is, an initial processing type of an input variable t in the expression ⑥ is non-differentiation, and processing types of an output variable in the two branch expressions are differentiation. A derivation result obtained through derivation of the expression ⑤ is: t_grad_x=10. In a derivation process of the expression ⑥, a derivation result of the input variable t is f_grad_t=0, and derivation results of the output variable x in two branches are respectively res_grad_x=3 and res_grad_x=2. Then, the derivation result of the expression ⑤ is combined with a derivation result of a subexpression in each of the two conditional branches based on the chain derivation rule, to obtain two derivation results of the program 2: f_grad_x=res_grad_x+ grad_t*t_grad_x and f_grad_x=res_grad_x+ grad_t*t_grad_x. Finally, the two derivation results of the program 2 are combined with expressions that do not undergo derivation and that are in the expression ⑤ and the expression ⑥, to obtain a compilation result of the program 2, as shown below:

A derivative function expression obtained by compiling the program 2 by using the conventional compilation technology is as follows:

```
func f_grad(x){
    t=x*10
    t_grad_x=10
    if(t==100){
        res_grad_x=3
    f_grad_t=0
        f_grad_x=res_grad_x+f_grad_t*t_grad_x
        return f_grad_x
    }else{
        res_grad_x=2
    f_grad_t=0
        f_grad_x=res_grad_x+grad_t*t_grad_x
        return f_grad_x
    }
}
```

In a process of compiling the program 2 in embodiments, the program 2 may also be divided into two expressions: the expression ⑤ and the expression ⑥. In this case, a dependency relationship is generated between the expression ⑤ and the expression ⑥ based on the variable t. Therefore, according to the compilation method in embodiments, a type conflict between the output variable t in the expression ⑤ and the input variable t in the expression ⑥ is detected in advance. If the operation type of the input variable t is updated to differentiation, it is detected that a differentiation result of the input variable t in the expression ⑥ is zero. Therefore, a compiler detects that a differentiation result of the variable t can be simplified when derivation results of the expression ⑤ and the expression ⑥ are combined. In this case, in a process of performing derivation on the expression ⑤ and the expression ⑥, the compiler does not perform a differentiation operation on the variable t in the expression ⑤ and the expression ⑥. In this case, the expression ⑤ has no differentiation result, and differentiation results of the two conditional branches in the expression ⑥ are res_grad_x=3 and res_grad_x=2. A derivation result of the expression ⑤ is combined with a derivation result of an expression in each of the two conditional branches, to obtain two derivation results of the program 2: f_grad_x=res_grad_x and f_grad_x=res_grad_x. Finally, the two derivation results of the program 2 are combined with an expression that does not undergo derivation, to obtain a compilation result of the program 2, as shown below:

A derivative function expression obtained by compiling the program 2 by using a compilation technology in this specification is as follows:

```
func f_grad(x: Float64, y: Float64)->Float64{
    t=x*10
    if(t==100){
        var res_grad_x=3
        var f_grad_x=res_grad_x
        return f_grad_x
    }else{
        var res_grad_x=2
        var f_grad_x=res_grad_x
        return f_grad_x
    }
}
```

It can be learned from the example of the program 2 that, in embodiments, global type conflict determining is performed, an operation type of a variable with an operation type conflict is updated to non-differentiation, and it is determined that derivation does not need to be performed on the expression "t=x*10". Therefore, the derivation results of the program 2 that are obtained through combination based on the chain derivation rule can be simplified, so that the compilation result of the program 2 is simplified, and there is no redundant code in the compilation result. This can effectively improve running performance of a compiled program.

FIG. 6 is a schematic diagram of a structure of a compilation apparatus 600 according to an embodiment, where the apparatus 600 includes:

an obtaining unit 601, configured to obtain a first expression and a second expression of a program, where both the first expression and the second expression include a first variable, the first variable is an input variable in the first expression, the first variable is an output variable in the second expression, and an operation type of the first variable in the first expression is different from an operation type of the first variable in the second expression:

an updating unit 602, configured to update the operation type of the first variable in the first expression and/or the operation type of the first variable in the second expression, so that an updated operation type of the first variable is consistent in the first expression and the second expression, where the updated operation type of the first variable indicates that the first variable has no differentiation result or has a differentiation result of zero after undergoing a differentiation operation:

a processing unit 603, configured to process the first expression and the second expression based on the updated operation type of the first variable, to obtain a derivative function expression corresponding to the first expression and a derivative function expression corresponding to the second expression; and a combination unit 604, configured to combine, according to a chain rule, the derivative function expression corresponding to the first expression and the derivative function expression corresponding to the second expression, to obtain a compilation result of the program, where the compilation result of the program is related to a combination result of the derivative function expression corresponding to the first expression and the derivative function expression corresponding to the second expression.

It should be understood that the apparatus 600 herein is embodied in a form of a functional unit. The term "unit" herein may be an application-specific integrated circuit (application-specific integrated circuit, ASIC), an electronic circuit, a processor (for example, a shared processor, a dedicated processor, or a group processor) configured to execute one or more software or firmware programs and a memory, a combined logic circuit, and/or another suitable component that supports the described function. In an optional example, a person skilled in the art can understand that the apparatus 600 may be specifically the compiler in the foregoing method 400, and the apparatus 600 may be configured to perform each procedure and/or step corresponding to the compiler in the foregoing method embodiment 400. To avoid repetition, details are not described herein again.

In a feasible implementation, when the updated operation type of the first variable is differentiation, the first variable has the differentiation result of zero after undergoing the differentiation operation.

In a feasible implementation, when the updated operation type of the first variable is non-differentiation, the first variable has no differentiation result after undergoing the differentiation operation.

Specifically, when the first variable has no differentiation result after undergoing the differentiation operation, the compilation result of the program does not include an item corresponding to the first variable.

In a feasible implementation, when a user requires that a derivative of a first output variable of the program with respect to a first input variable of the program be output, and the derivative is obtained based on a combination of differentiation results of the first variable, warning information is generated, where the warning information indicates locations of the first expression and the second expression in the program, and the first variable.

In a feasible implementation, the operation type of the first variable in the first expression is determined by a mathematical calculation rule indicated by semantics of the first expression, and the operation type of the first variable in the second expression is determined by a mathematical calculation rule indicated by semantics of the second expression.

In a feasible implementation, when the first expression or the second expression is a conditional statement or a loop statement, and the first variable is located in a condition selection expression of the conditional statement or a loop control expression of the loop statement, the operation type of the first variable is non-differentiation.

Figure 7:
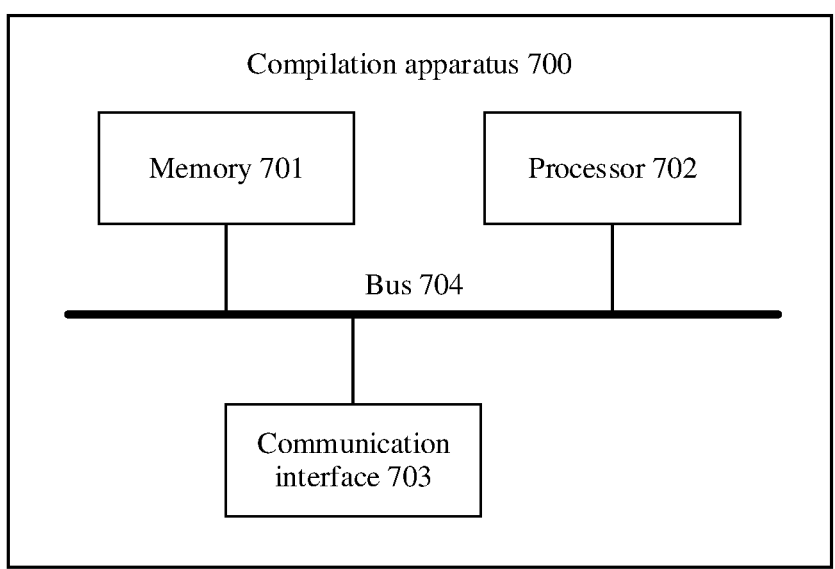
FIG. 7 is a schematic diagram of a hardware structure of a compilation apparatus according to an embodiment.

FIG. 7 is a schematic diagram of a hardware structure of a compilation apparatus according to an embodiment. As shown in FIG. 7, the apparatus may include a memory 701, one or more processors 702 (only one is shown in the figure), a communication interface 703, and a bus 704. The memory 701, the processor 702, and the communication interface 703 are communicatively connected to each other by using the bus 704.

The memory 701 is configured to store instructions. The processor 702 is configured to invoke the instructions stored in the memory 701. The instructions may be the program in the foregoing embodiments.

The processor 702 is specifically configured to: obtain a first expression and a second expression of a program, where both the first expression and the second expression include a first variable, the first variable is an input variable in the first expression, the first variable is an output variable in the second expression, and an operation type of the first variable in the first expression is different from an operation type of the first variable in the second expression: update the operation type of the first variable in the first expression and/or the operation type of the first variable in the second expression, so that an updated operation type of the first variable is consistent in the first expression and the second expression, where the updated operation type of the first variable indicates that the first variable has no differentiation result or has a differentiation result of zero after undergoing a differentiation operation: process the first expression and the second expression based on the updated operation type of the first variable, to obtain a derivative function expression corresponding to the first expression and a derivative function expression corresponding to the second expression; and combine, according to a chain rule, the derivative function expression corresponding to the first expression and the derivative function expression corresponding to the second expression, to obtain a compilation result of the program, where the compilation result of the program is related to a combination result of the derivative function expression corresponding to the first expression and the derivative function expression corresponding to the second expression.

The compilation apparatus in this embodiment can use the compilation method in embodiments in a compilation phase, to simplify a derivative function expression corresponding to the program, so that the compilation result of the program does not include redundant code, thereby effectively improving running performance of a compiled program.

It should be understood that the apparatus 700 may be specifically a computer, and may be configured to perform each step and/or procedure corresponding to the compiler in the foregoing method embodiment 400 and the embodiment 500.

The memory 701 may be a read-only memory (ROM), a static storage device, a dynamic storage device, or a random access memory (RAM). The memory 701 may store a program. When the program stored in the memory 701 is executed by the processor 702, the processor 702 and the communication interface 703 are configured to perform the steps of the compilation method in embodiments.

The processor 702 may be a general-purpose central processing unit (CPU), a microprocessor, an application-specific integrated circuit (ASIC), a graphics processing unit (GPU), or one or more integrated circuits, and is configured to execute a related program, so as to implement functions that need to be performed by the units in the compilation apparatus in embodiments, or perform the compilation method in method embodiments.

Alternatively, the processor 702 may be an integrated circuit chip having a signal processing capability. In an implementation process, the steps of the compilation method in this specification may be implemented by using instructions in a form of software in the processor 702. Alternatively, the processor 702 may be a general purpose processor, a digital signal processor (digital signal processor, DSP), an application-specific integrated circuit (ASIC), a field programmable gate array (FPGA) or another programmable logic device, a discrete gate or transistor logic device, or a discrete hardware component, and can implement or perform the methods, steps, and logical block diagrams disclosed in embodiments. The general purpose processor may be a microprocessor, or the processor may be any conventional processor or the like. The steps of the methods disclosed with reference to embodiments may be directly implemented by a hardware decoding processor, or may be implemented by using a combination of hardware in a decoding processor and a software module. The software module may be located in a storage medium mature in the art, such as a random access memory, a flash memory, a read-only memory, a programmable read-only memory, an electrically erasable programmable memory, or a register. The storage medium is located in the memory 701. The processor 702 reads information in the memory 701, and implements, in combination with hardware of the processor, the functions that need to be performed by the units included in the compilation apparatus in embodiments, or performs the compilation method in method embodiments.

By way of example, and not as a limitation, a transceiver apparatus such as a transceiver is used for the communication interface 703, to implement communication between the apparatus 700 and another device or a communication network. For example, the program may be obtained by using the communication interface 703.

The bus 704 may include a path for transferring information between the components (for example, the memory 701, the processor 702, and the communication interface 703) of the apparatus 700.

It can be clearly understood by a person skilled in the art that, for ease and brevity of description, for specific working processes of the foregoing system, apparatus, and unit, reference may be made to corresponding processes in the foregoing method embodiments. Details are not described herein again.

In the several embodiments provided in this specification, it should be understood that the disclosed system, apparatus, and method may be implemented in other manners. For example, the described apparatus embodiment is merely an example. For example, division into the units is merely logical function division, and there may be another division manner during actual implementation. For example, a plurality of units or components may be combined or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may be or may not be physically separate, and components displayed as units may be or may not be physical units, and may be located in one position, or may be distributed on a plurality of network units. Some or all of the units may be selected based on an actual requirement to achieve the objectives of the solutions in embodiments.

In addition, functional units in embodiments may be integrated into one processing unit, or each of the units may exist alone physically, or two or more units may be integrated into one unit.

When the function is implemented in a form of a software function unit and is sold or used as an independent product, the function may be stored in a computer-readable storage medium. Based on such an understanding, the technical solutions in this specification essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or some of the steps of the method in embodiments. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations, but are not intended to limit the protection scope. Any variation or replacement readily figured out by a person skilled in the art within the technical scope disclosed herein shall fall within the protection scope. Therefore, the protection scope shall be subject to the protection scope of the claims.

What is claimed is:

1. An automatic program compilation method comprising:
obtaining a first expression and a second expression of a program, wherein both the first expression and the second expression comprise a first variable, wherein the first variable is an input variable in the first expression, and the first variable is an output variable in the second expression, and an operation type of the first variable in the first expression is different from an operation type of the first variable in the second expression;

updating the operation type of the first variable in the first expression and/or the operation type of the first variable in the second expression, so that an updated operation type of the first variable is consistent in the first expression and the second expression, wherein the updated operation type of the first variable indicates that the first variable has no differentiation result or has a differentiation result of zero after undergoing a differentiation operation;

processing the first expression and the second expression based on the updated operation type of the first variable, to obtain a derivative function expression corresponding to the first expression and a derivative function expression corresponding to the second expression; and combining, according to a chain rule, the derivative function expression corresponding to the first expression and the derivative function expression corresponding to the second expression, to obtain a compilation result of the program that is related to a combination result of the derivative function expression corresponding to the first expression and the derivative function expression corresponding to the second expression.

2. The automatic program compilation method according to claim 1, wherein when the updated operation type of the first variable is differentiation, the first variable has the differentiation result of zero after undergoing the differentiation operation.

3. The automatic program compilation method according to claim 1, wherein when the updated operation type of the first variable is non-differentiation, the first variable has no differentiation result after undergoing the differentiation operation.

4. The automatic program compilation method according to claim 3, wherein when a user requires that a derivative of a first output variable of the program with respect to a first input variable of the program be output, and the derivative is obtained based on a combination of differentiation results of the first variable, warning information is generated, wherein the warning information indicates locations of the first expression and the second expression in the program, and the first variable.

5. The automatic program compilation method according to claim 1 wherein the operation type of the first variable in the first expression is determined by a mathematical calculation rule indicated by semantics of the first expression, and the operation type of the first variable in the second expression is determined by a mathematical calculation rule indicated by semantics of the second expression.

6. The automatic program compilation method according to claim 5, wherein when the first expression or the second expression is a conditional statement or a loop statement, and the first variable is located in a condition selection expression of the conditional statement or a loop control expression of the loop statement, the operation type of the first variable is non-differentiation.

7. The automatic program compilation method according to claim 1, wherein when the first variable has no differentiation result after undergoing the differentiation operation, the compilation result of the program does not comprise an item corresponding to the first variable.

8. An automatic program compilation apparatus including:

an obtaining circuit and/or processor configured to obtain a first expression and a second expression of a program, wherein both the first expression and the second expression comprise a first variable, wherein the first variable is an input variable in the first expression, the first variable is an output variable in the second expression, and an operation type of the first variable in the first expression is different from an operation type of the first variable in the second expression;

an updating circuit and/or processor configured to update the operation type of the first variable in the first expression and/or the operation type of the first variable in the second expression, so that an updated operation type of the first variable is consistent in the first expression and the second expression, wherein the updated operation type of the first variable indicates that the first variable has no differentiation result or has a differentiation result of zero after undergoing a differentiation operation;

a calculating circuit and/or processor configured to process the first expression and the second expression based on the updated operation type of the first variable, to obtain a derivative function expression corresponding to the first expression and a derivative function expression corresponding to the second expression; and a combination circuit and/or processor, configured to combine, according to a chain rule, the derivative function expression corresponding to the first expression and the derivative function expression corresponding to the second expression, to obtain a compilation result of the program, wherein the compilation result of the program is related to a combination result of the derivative function expression corresponding to the first expression and the derivative function expression corresponding to the second expression.

9. The automatic program compilation apparatus according to claim 8, wherein when the updated operation type of the first variable is differentiation, the first variable has the differentiation result of zero after undergoing the differentiation operation.

10. The automatic program compilation apparatus according to claim 8, wherein when the updated operation type of the first variable is non-differentiation, the first variable has no differentiation result after undergoing the differentiation operation.

11. The automatic program compilation apparatus according to claim 10, wherein when a user requires that a derivative of a first output variable of the program with respect to a first input variable of the program be output, and the derivative is obtained based on a combination of differentiation results of the first variable, warning information is generated, wherein the warning information indicates locations of the first expression and the second expression in the program, and the first variable.

12. The automatic program compilation apparatus according to claim 8, wherein the operation type of the first variable in the first expression is determined by a mathematical calculation rule indicated by semantics of the first expression, and the operation type of the first variable in the second expression is determined by a mathematical calculation rule indicated by semantics of the second expression.

13. The automatic program compilation apparatus according to claim 12, wherein when the first expression or the second expression is a conditional statement or a loop statement, and the first variable is located in a condition selection expression of the conditional statement or a loop control expression of the loop statement, the operation type of the first variable is non-differentiation.

14. The automatic program compilation apparatus according to claim 8, wherein when the first variable has no differentiation result after undergoing the differentiation operation, the compilation result of the program does not comprise an item corresponding to the first variable.

15. A chip system comprising at least one processor, at least one memory, and an interface circuit, wherein the at least one memory, the interface circuit, and the at least one processor are interconnected, the at least one memory storing instructions that when executed by the at least one processor, cause the at least one processor to perform operations comprising:

obtaining a first expression and a second expression of a program, wherein both the first expression and the second expression comprise a first variable, wherein the first variable is an input variable in the first expression and the first variable is an output variable in the second expression, and an operation type of the first variable in the first expression is different from an operation type of the first variable in the second expression;

updating the operation type of the first variable in the first expression and/or the operation type of the first variable in the second expression, so that an updated operation type of the first variable is consistent in the first expression and the second expression, wherein the updated operation type of the first variable indicates that the first variable has no differentiation result or has a differentiation result of zero after undergoing a differentiation operation;

processing the first expression and the second expression based on the updated operation type of the first variable, to obtain a derivative function expression corresponding to the first expression and a derivative function expression corresponding to the second expression; and combining, according to a chain rule, the derivative function expression corresponding to the first expression and the derivative function expression corresponding to the second expression, to obtain a compilation result of the program that is related to a combination result of the derivative function expression corresponding to the first expression and the derivative function expression corresponding to the second expression.

16. The chip system according to claim 15, wherein when the updated operation type of the first variable is differentiation, the first variable has the differentiation result of zero after undergoing the differentiation operation.

17. The chip system according to claim 16, wherein when the updated operation type of the first variable is non-differentiation, the first variable has no differentiation result after undergoing the differentiation operation.

18. A non-transitory computer-readable storage medium that stores program code for execution by a device, the program code being used to perform the operations comprising:

obtaining a first expression and a second expression of a program, wherein both the first expression and the second expression comprise a first variable, wherein the first variable is an input variable in the first expression and the first variable is an output variable in the second expression, and an operation type of the first variable in the first expression is different from an operation type of the first variable in the second expression;

updating the operation type of the first variable in the first expression and/or the operation type of the first variable in the second expression, so that an updated operation type of the first variable is consistent in the first expression and the second expression, wherein the updated operation type of the first variable indicates that the first variable has no differentiation result or has a differentiation result of zero after undergoing a differentiation operation;

processing the first expression and the second expression based on the updated operation type of the first variable, to obtain a derivative function expression corresponding to the first expression and a derivative function expression corresponding to the second expression; and combining, according to a chain rule, the derivative function expression corresponding to the first expression and the derivative function expression corresponding to the second expression, to obtain a compilation result of the program that is related to a combination result of the derivative function expression corresponding to the first expression and the derivative function expression corresponding to the second expression.

19. The non-transitory computer-readable storage medium according to claim 18, wherein when the updated operation type of the first variable is differentiation, the first variable has the differentiation result of zero after undergoing the differentiation operation.

20. The non-transitory computer-rea storage medium according to claim 18, wherein when the updated operation type of the first variable is non-differentiation, the first variable has no differentiation result after undergoing the differentiation operation.

* * * * *